United States Patent
Chen et al.

(10) Patent No.: US 11,601,208 B2
(45) Date of Patent: Mar. 7, 2023

(54) PARAMETER CALIBRATION METHOD AND SEMICONDUCTOR DEVICE UTILIZING THE SAME

(71) Applicant: Realtek Semiconductor Corp., HsinChu (TW)

(72) Inventors: Yun-Tse Chen, HsinChu (TW); Yan-Guei Chen, HsinChu (TW); Shi-Ming Lu, HsinChu (TW); Liang-Wei Huang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 44 days.

(21) Appl. No.: 17/494,797

(22) Filed: Oct. 5, 2021

(65) Prior Publication Data
US 2022/0190937 A1    Jun. 16, 2022

(30) Foreign Application Priority Data
Dec. 14, 2020 (TW) .................................. 109144001

(51) Int. Cl.
  *H04B 7/00* (2006.01)
  *H04B 17/21* (2015.01)

(52) U.S. Cl.
  CPC .................................... *H04B 17/21* (2015.01)

(58) Field of Classification Search
  CPC ......... H04B 17/21; H04B 17/11; H04B 17/16
  See application file for complete search history.

(56) References Cited

U.S. PATENT DOCUMENTS

| | | | | |
|---|---|---|---|---|
| 7,698,802 B2* | 4/2010 | Clements | ............. | G01R 35/007 29/842 |
| 8,120,394 B2* | 2/2012 | Tarng | ...................... | H03L 7/099 331/10 |
| 10,522,203 B2* | 12/2019 | Jung | ................ | G11C 29/50008 |
| 2016/0028422 A1 | 1/2016 | Shimizu | | |

FOREIGN PATENT DOCUMENTS

CN    108111443    6/2018

* cited by examiner

*Primary Examiner* — Tuan Pham
(74) *Attorney, Agent, or Firm* — Winston Hsu

(57) ABSTRACT

Parameter calibration method for calibrating multiple parameters corresponding to multiple electronic components to be calibrated in a circuit, including steps: (A) turning off all of the electronic components to be calibrated and selecting a first electronic component from the electronic components to be calibrated as an electronic component being calibrated; (B) turning on the electronic component being calibrated and performing a calibration procedure on the electronic component being calibrated to determine a setting value of a parameter corresponding to the electronic component being calibrated; and (C) selecting a second electronic component from the electronic components to be calibrated as the electronic component being calibrated and performing step (B). Step (C) is repeatedly performed until all of the electronic components to be calibrated have become electronic components that have been calibrated, and when performing step (C), the electronic component(s) that have been calibrated are kept being turned on.

16 Claims, 7 Drawing Sheets

PARAMETER CALIBRATION METHOD AND SEMICONDUCTOR DEVICE UTILIZING THE SAME

BACKGROUND OF THE INVENTION

1. Field of the Invention

The invention relates to a parameter calibration method for calibrating parameter of a circuit, more particularly to a parameter calibration method for compensating for parameter shift of an equalizer circuit caused by process variation.

2. Description of the Prior Art

Signal attenuation is an inevitable problem in the communication process. Generally, the longer the transmission distance, the more severe the attenuation in the high frequency components of the signal. Therefore, the equalizer is usually utilized in the communication system to compensate for signal attenuation.

For long distance signal transmission, the receiver usually has to estimate the length of transmission line or the length of transmission channel, and uses this information to adjust the parameters of the equalizer circuit, such as setting adequate signal gain according to the transmission distance, so as to optimize the overall signal to noise ratio (SNR). Therefore, being able to accurately estimate the transmission distance so as to select proper parameters is usually an important factor in whether the communication system can operate normally.

However, the designed value of the electronic components (e.g. the capacitance, the resistance, or the likes) may shift due to the process variation during the wafer manufacturing process. Therefore, a specific element of the same product in different chips may have different amount of shift when the chips are belonging to different process corners (e.g. Fast/Fast (FF) corner, Slow/Slow (SS) corner, Typical/Typical (TT) corner, etc.). For an equalizer, the parameter shift may cause the peak of the high-frequency gain to shift and also the change in the peak value. Thus, for different chips under the same transmission distance, completely different frequency responses will be generated due to the difference in the equalizer parameters, which further affecting the accuracy of estimating the length of the transmission line or the length of the transmission channel. Inaccurate length estimation will further lead to incorrect receiver parameter settings, and finally cause Cyclic Redundancy Check (CRC) errors and transmission packet loss.

To solve this problem, a parameter calibration method for compensating for parameter shift of a circuit caused by process variation is highly required.

SUMMARY OF THE INVENTION

It is an objective of the invention to solve the problem of circuit parameter shift caused by process variation.

According to an embodiment of the invention, a parameter calibration method for calibrating a plurality of parameters corresponding to a plurality of electronic components to be calibrated in a circuit comprises following steps: (A) turning off all of the electronic components to be calibrated and selecting a first electronic component from the electronic components to be calibrated as an electronic component being calibrated; (B) turning on the electronic component being calibrated and performing a calibration procedure on the electronic component being calibrated to determine a setting value of a parameter corresponding to the electronic component being calibrated, wherein after determining the setting value, the electronic component being calibrated becomes an electronic component that has been calibrated; and, (C) selecting a second electronic component from the electronic components to be calibrated as the electronic component being calibrated and performing step (B). Step (C) is repeatedly performed until all of the electronic components to be calibrated have become electronic components that have been calibrated, and when performing step (C), the electronic component(s) that have been calibrated are kept being turned on.

According to another embodiment of the invention, a semiconductor device comprises an equalizer circuit and a control unit coupled to the equalizer circuit and configured to calibrate a plurality of parameters corresponding to a plurality of electronic components to be calibrated in the equalizer circuit. The control unit is configured to perform following operations: (A) turning off all of the electronic components to be calibrated in the equalizer circuit and selecting a first electronic component from the electronic components to be calibrated as an electronic component being calibrated; (B) turning on the electronic component being calibrated and performing a calibration procedure on the electronic component being calibrated to determine a setting value of a parameter corresponding to the electronic component being calibrated; and (C) selecting a second electronic component from the electronic components to be calibrated as the electronic component being calibrated and performing operation (B). Operation (C) is repeatedly performed until all of the electronic components to be calibrated have become electronic components that have been calibrated, and when performing operation (C), the electronic component(s) that have been calibrated are kept being turned on.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
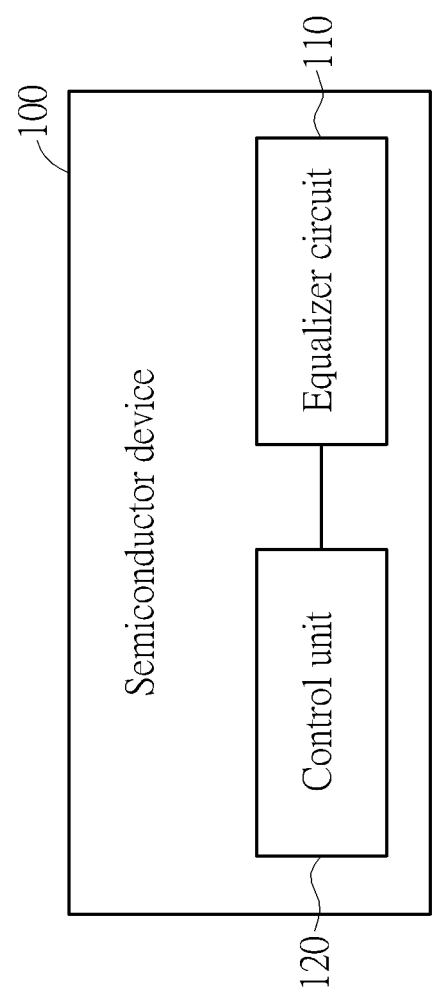
FIG. 1 is a block diagram of a semiconductor device according to an embodiment of the invention.

FIG. 1 is a block diagram of a semiconductor device according to an embodiment of the invention. The semiconductor device 100 may be an integrated circuit (IC) or a chip, for example, a receiver chip applicable to a communication system. The semiconductor device 100 may at least comprise a control unit 120 and an equalizer circuit 110, e.g., a continuous time linear equalization (CTLE). The control unit 120 is coupled to the equalizer circuit 110 and configured to calibrate the parameters corresponding to the electronic components of the equalizer circuit 110 after the semiconductor device 100 is manufactured, for example, after the chip leaves the factory. According to an embodiment of the invention, the control unit 120 may be programed with a predetermined firmware code in advance, and the control unit 120 may start to perform a parameter calibration procedure on the equalizer circuit 110 by executing the predetermined firmware code. Through the parameter calibration, the frequency response of the equalizer circuit 110 may be adjusted to have a specific shape, so as to overcome the aforementioned parameter shift problem occurred in the parameters corresponding to the electronic components of the equalizer circuit 110 due to process variations in the manufacturing process of the semiconductor device. In this manner, even if a plurality of semiconductor devices manufactured based on the same circuit configuration are eventually distributed in different process corners, such as the aforementioned FF corner, SS corner, or TT corner, etc., the frequency response of the equalizer circuit 110 in each semiconductor device may still be calibrated to have the same or a quite similar shape.

It is to be noted that FIG. 1 is a simplified block diagram in which only the components related to the invention are shown. As will be readily appreciated by a person of ordinary skill in the art, a semiconductor device or a receiver chip may comprise other components not shown in FIG. 1, such as the antenna, the power amplifier, the mixer, the radio frequency signal processing circuit, etc., so as to implement the required signal processing function.

Figure 2:
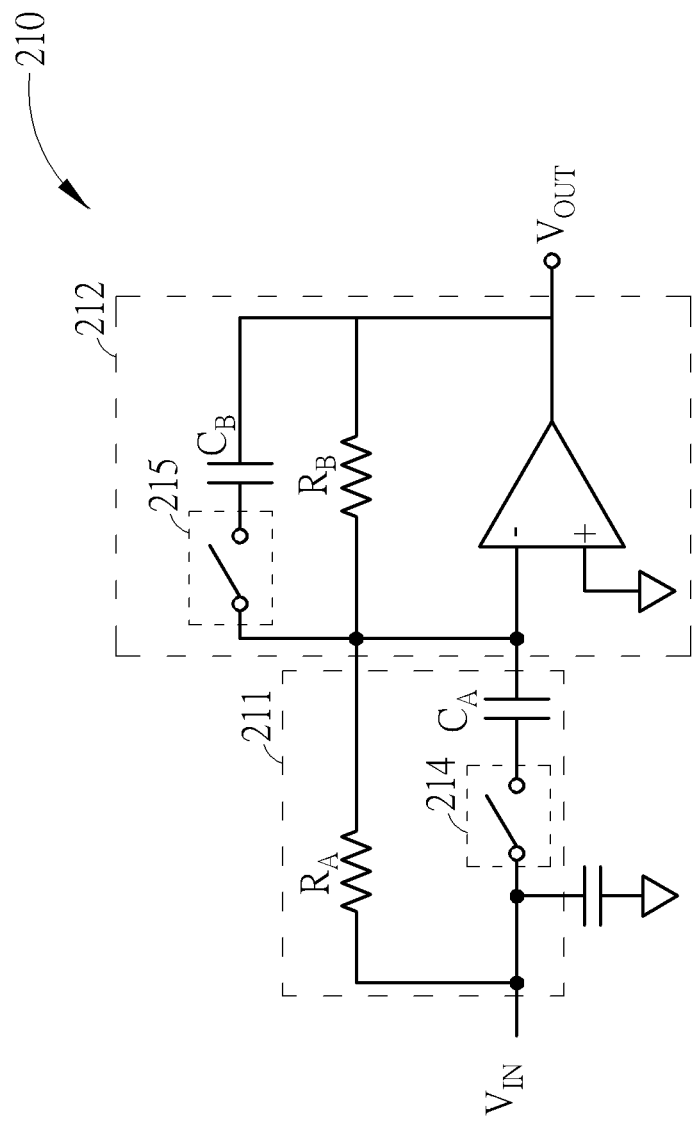
FIG. 2 shows an exemplary circuit diagram of the equalizer circuit according to an embodiment of the invention.

FIG. 2 shows an exemplary circuit diagram of the equalizer circuit according to an embodiment of the invention. The equalizer circuit 210 may comprise one or more filter circuits, e.g., the filter circuits 211 and 212. The filter circuit 211 may comprise a resistor $R_A$ and a capacitor $C_A$, and the filter circuit 212 may comprise a resistor $R_B$ and a capacitor $C_B$, or may further comprise an amplifier circuit 213. In the embodiment of the invention, the electronic components to be calibrated in the semiconductor device 100 may be the capacitors in the equalizer circuit, for example, the capacitor $C_A$ in the filter circuit 211 and the capacitance $C_B$ in the filter circuit 212, and the parameters to be calibrated are the capacitance of the capacitors.

It is to be noted that FIG. 2 only shows one of a variety of equalizer circuits that can be applied to the invention. Those with ordinary skill in the art will understand that the proposed parameter calibration method may be applied to any equalizer circuit not shown in this specification. In addition, it is to be noted that the proposed parameter calibration method is not limited to only be applied for calibrating the electronic components comprised in the equalizer circuit. Those with ordinary skill in the art will understand that the proposed parameter calibration method can be applied to any circuit in a semiconductor device, so as to compensate for the shift or deviation of the parameter corresponding to the electronic component in the circuit due to process variation.

Figure 3:
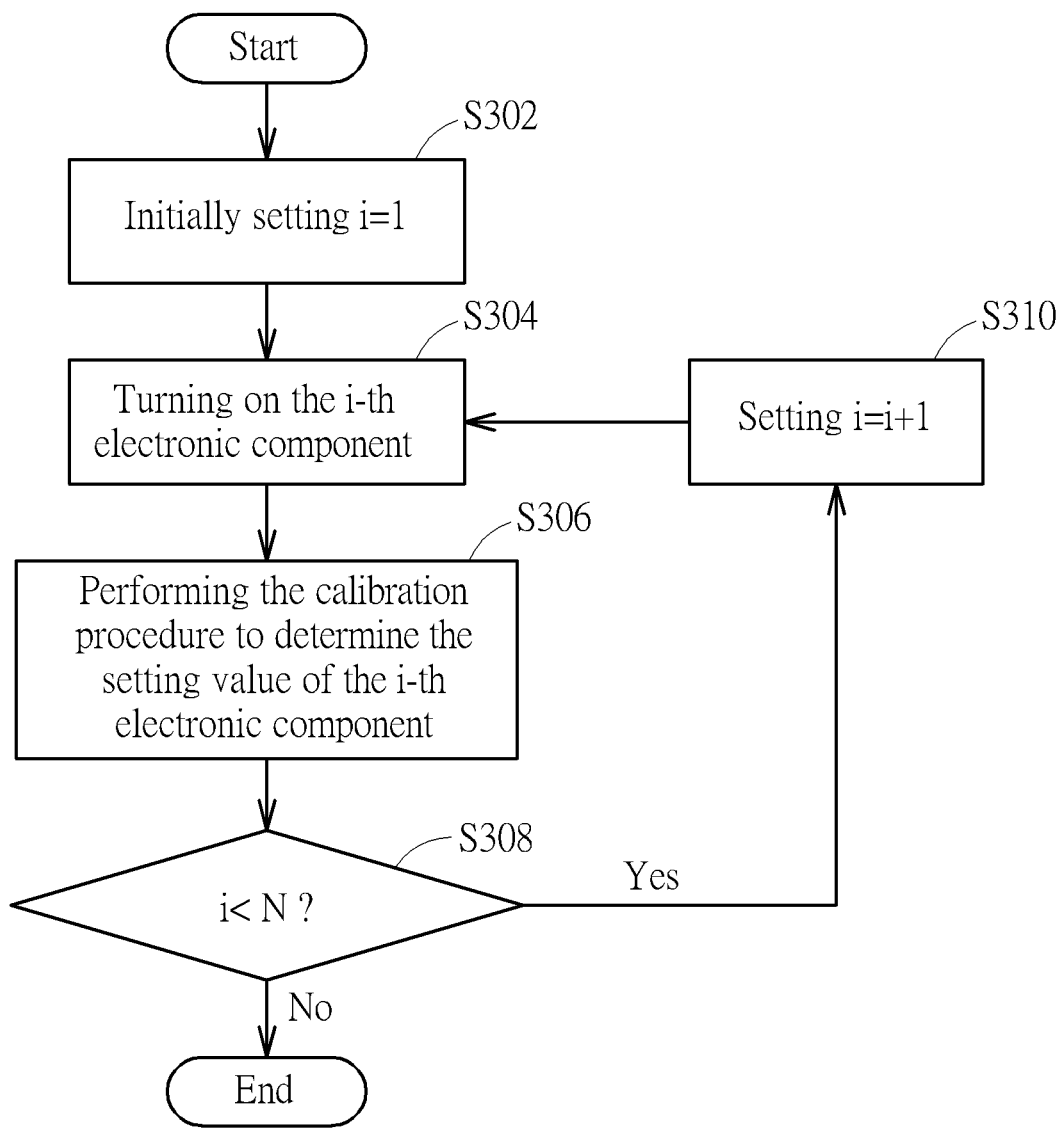
FIG. 3 shows a flow chart of a parameter calibration procedure according to an embodiment of the invention.

FIG. 3 shows a flow chart of a parameter calibration procedure according to an embodiment of the invention. The parameter calibration procedure may comprise the following steps/operations performed or controlled by the control unit 120:

Step S302: turning off all of the electronic components to be calibrated in the circuit (for example, the equalizer circuit 110) and selecting a first electronic component from the electronic components to be calibrated as an electronic component being calibrated (corresponding to the step/operation (A) in the following paragraph). For example, suppose that the total number of electronic components to be calibrated in the circuit is N, the control unit 120 may use the variable i as the index of the electronic components to be calibrated, where 1<i<N, and i and N are both positive integers. In step S302, the control unit 120 may initially set i=1. Referring back to FIG. 2, suppose that the electronic components to be calibrated comprise capacitors $C_A$ and $C_B$, the control unit 120 may use the switch devices 214 and 215 to respectively control the on or off status of the capacitors $C_A$ and $C_B$. In step S302, the control unit 120 may control the statuses of the switching devices 214 and 215 to be "open", thereby turning off the capacitors $C_A$ and $C_B$, so that they are disabled in the circuit. It is to be noted that in the embodiment of the invention, the selection sequence of the electronic components to be calibrated is not limited.

Step S304: turning on the electronic component being calibrated (corresponding to a portion of the step/operation (B) in the following paragraph), that is, turning on the i-th electronic component. Continuing the previous example, in step S304, the control unit 120 may control the status of the switching device 214 to be "close", thereby turning on and enabling the capacitor $C_A$.

Step S306: performing a calibration procedure on the electronic component being calibrated to determine a setting value of a parameter corresponding to the electronic component being calibrated (corresponding to another portion of the step/operation (B) in the following paragraph), that is, determining the setting value of the i-th electronic component. Details of the calibration procedure will be described in the following paragraphs. After determining the setting value of the parameter corresponding to the electronic component being calibrated, the electronic component being calibrated becomes an electronic component that has been calibrated. For example, the control unit 120 may regard it as a calibrated electronic component.

Step S308: determining whether the calibration procedures of all electronic components to be calibrated are completed. For example, determining whether i<N. If yes, step S310 is processed. If not, for example, i>=N, it means that the calibration procedures of all electronic components to be calibrated are completed and the calibration procedures may be ended.

Step S310: selecting a second electronic component from the electronic components to be calibrated as the next electronic component being calibrated, for example, the control unit 120 may set i=i+1, and return to step S304 (corresponding to the step/operation (C) in the following paragraph). Continuing the previous example, when entering step S304 again, the control unit 120 may control the status of the switching device 215 to be "close", thereby turning on and enabling the capacitor $C_B$.

In the embodiments of the invention, the calibration procedure of the electronic components may be repeatedly performed until all of the electronic components to be calibrated have become the electronic components that have been calibrated. In addition, in the embodiments of the invention, the components to be calibrated will be turned on one after one. That is, every time when step S304 is performed, only the electronic component currently being selected as the electronic component being calibrated will be turned on, and the other electronic components that have not yet been selected for calibration will not be turned on. In addition, in the embodiments of the invention, the control unit 120 controls the electronic components that have been calibrated to remain being turned on.

According to the embodiments of the invention, the signals of a few frequency points may be used to perform the calibration procedure, so as to shorten the calibration period. The number of test signals may be flexibly selected according to the required computational complexity, length of the calibration period, and calibration accuracy.

Figure 4:
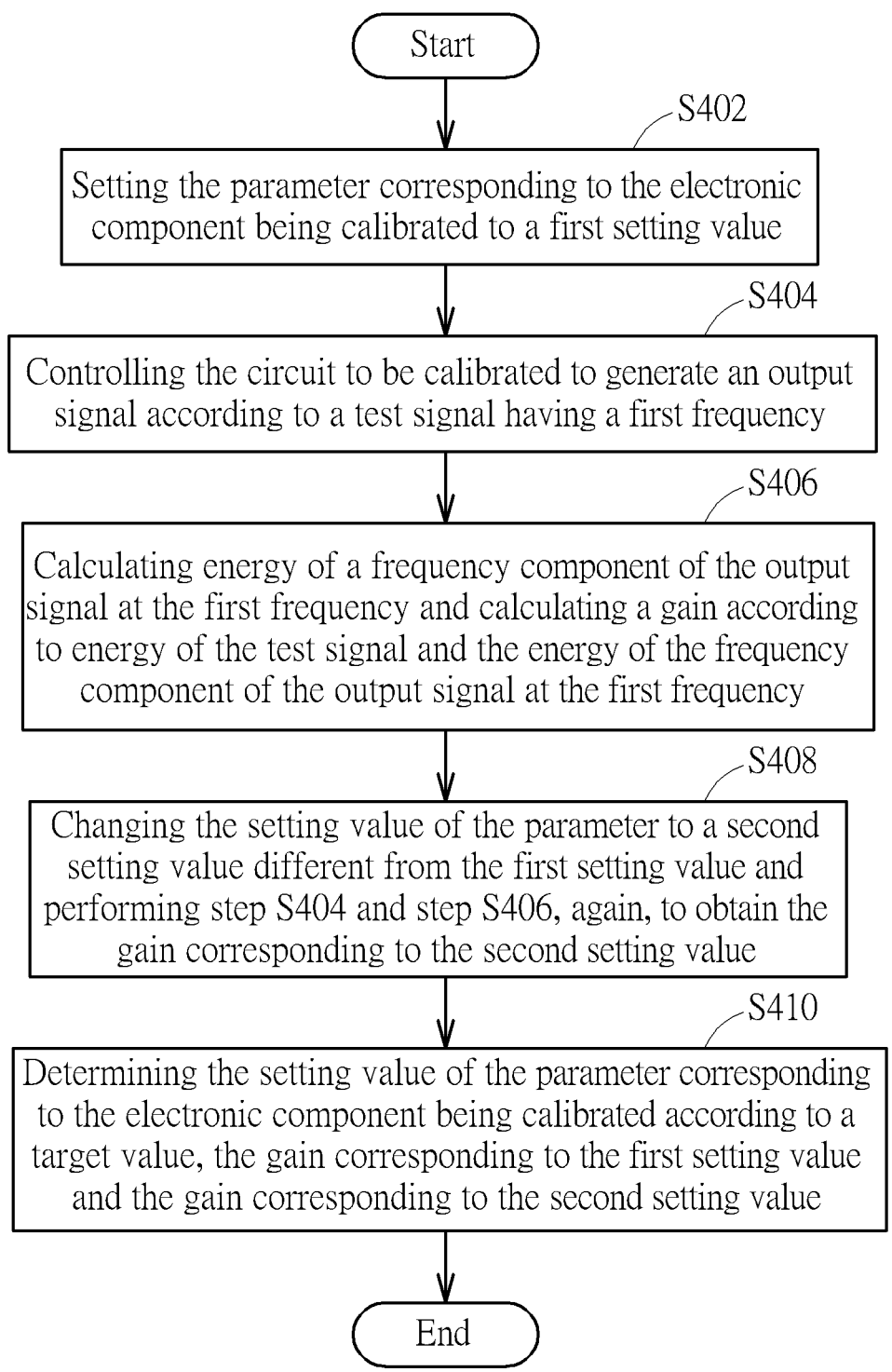
FIG. 4 shows an exemplary flow chart of a calibration procedure performed on an electronic component being calibrated according to an embodiment of the invention.

FIG. 4 shows an exemplary flow chart of a calibration procedure performed on an electronic component being calibrated according to an embodiment of the invention. The calibration procedure may comprise the following steps/operations performed by the control unit 120:

Step S402: Setting the parameter corresponding to the electronic component being calibrated to a first setting value. In the embodiment of the invention, the electronic components to be calibrated may have a plurality of corresponding setting values, and the setting values may be generated based on their original setting value in consideration of the process variation. For example, suppose that the process variation may cause 20% parameter shift or deviation, the control unit 120 may multiply the original setting value (for example, an original value of capacitance) set for an electronic component in the circuit design stage by a plurality of values distributed from (1−20%) to (1+20%), so as to generate a plurality of setting values that can be used in the corresponding calibration procedure.

Step S404: Controlling or making the circuit to be calibrated (for example, the equalizer circuit 110) to generate an output signal according to a test signal having a first frequency. According to an embodiment of the invention, the test signal may be a sine signal, a cosine signal, or other single-tone signals. The control unit 120 may directly input the test signal to the input terminal $V_{IN}$ of the equalizer circuit 110, making it to generate a corresponding output signal according to the test signal, and receive the output signal at the output terminal $V_{OUT}$ of the equalizer circuit 110.

Step S406: Calculating energy of a frequency component of the output signal at the first frequency and calculating a gain according to energy of the test signal and the energy of the frequency component of the output signal at the first frequency. In this operation, the control unit 120 may perform Fast Fourier Transform (FFT) on the output signal to obtain the energy on the spectrum, and compare it with the energy of the original test signal to obtain the corresponding gain.

Step S408: Changing the setting value of the parameter, for example, setting the parameter corresponding to the electronic component being calibrated to a second setting value different from the first setting value and performing step S404 and step S406 to obtain the gain corresponding to the second setting value.

Step S410: Determining the setting value of the parameter corresponding to the electronic component being calibrated according to a target value, the gain corresponding to the first setting value and the gain corresponding to the second setting value.

According to an embodiment of the invention, in step S410, the target value may be a target gain of the first frequency, and the control unit 120 may select from the first setting value and the second setting value the one with the corresponding gain closest to the target gain as the setting value of the parameter corresponding to the electronic component being calibrated.

It is to be noted that, in some embodiments of the invention, step S408 may also be repeatedly performed for multiple times according to different setting values of the parameters corresponding to the electronic components being calibrated. For example, in step S408, a determination may be added in the calibration procedure to determine whether all the setting values of the parameter have been tested. If not, step S408 is returned. If yes, step S410 is performed. After performing step S408 several times, the setting value in step S410 may be determined according to the target value and the gains corresponding to different setting values. For example, the control unit 120 may select the one from said different setting values with the corresponding gain closest to the target gain as the setting value of the parameter corresponding to the electronic component being calibrated.

Figure 5:
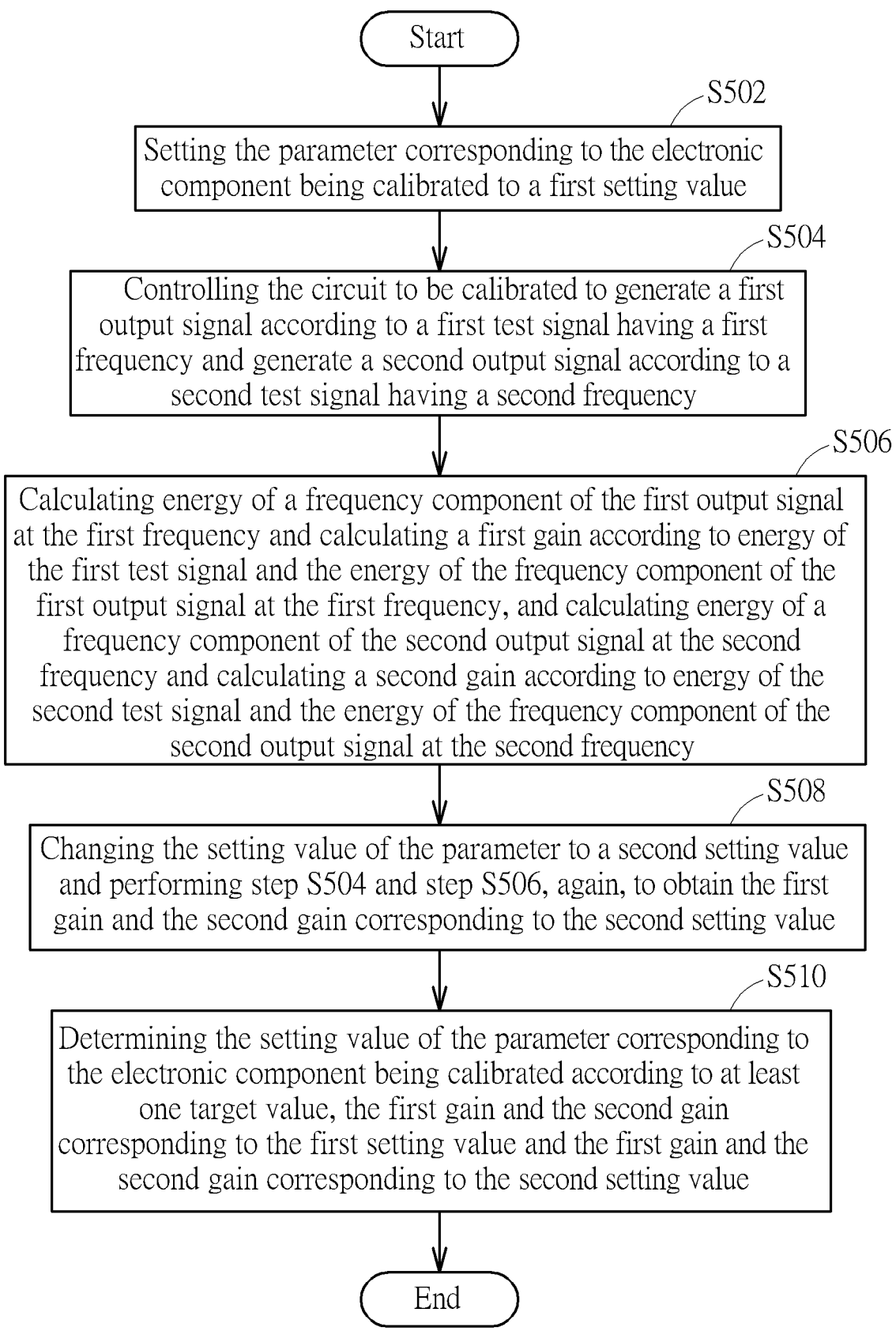
FIG. 5 shows an exemplary flow chart of a calibration procedure performed on an electronic component being calibrated according to another embodiment of the invention.

FIG. 5 shows an exemplary flow chart of a calibration procedure performed on an electronic component being calibrated according to another embodiment of the invention. The calibration procedure may comprise the following steps/operations executed by the control unit 120:

Step S502: Setting the parameter corresponding to the electronic component being calibrated to a first setting value. As discussed above, in the embodiment of the invention, the electronic components to be calibrated may have a plurality of corresponding setting values, and the setting values may be generated based on their original setting value in consideration of the process variation. For example, suppose that the process variation may cause 20% parameter shift or deviation, the control unit 120 may multiply the original setting value (for example, an original value of capacitance) set for an electronic component in the circuit design stage by a plurality of values distributed from (1−20%) to (1+20%), so as to generate a plurality of setting values that can be used in the corresponding calibration procedure.

Step S504: Controlling or making the circuit to be calibrated (for example, the equalizer circuit 110) to generate a first output signal according to a first test signal having a first frequency and generate a second output signal according to a second test signal having a second frequency. According to an embodiment of the invention, the test signal may be a sine signal, a cosine signal, or other single-tone signals. The control unit 120 may directly input the test signal to the input terminal $V_{IN}$ of the equalizer circuit 110, making it to generate a corresponding output signal according to the test signal, and receive the output signal at the output terminal $V_{OUT}$ of the equalizer circuit 110. In addition, in this embodiment, the first test signal and the second test signal may be respectively a low-frequency signal and a high-frequency signal.

Step S506: Calculating energy of a frequency component of the first output signal at the first frequency and calculating a first gain according to energy of the first test signal and the energy of the frequency component of the first output signal at the first frequency, and also calculating energy of a frequency component of the second output signal at the second frequency and calculating a second gain according to energy of the second test signal and the energy of the frequency component of the second output signal at the second frequency. In this operation, the control unit 120 may perform FFT on the output signals to obtain the energy on the spectrum, and compare it with the energy of the original test signals to obtain the corresponding gain. For example, the energy of the frequency component at the first/second frequency in the first/second output signal is divided by the energy of the first/second test signal to obtain the corresponding first/second gain.

Step S508: Changing the setting value of the parameter, for example, setting the parameter corresponding to the electronic component being calibrated to a second setting value different from the first setting value and performing step S504 and step S506 to obtain the first gain and the second gain corresponding to the second setting value.

Step S510: Determining the setting value of the parameter corresponding to the electronic component being calibrated according to at least one target value, the first gain and the second gain corresponding to the first setting value and the first gain and the second gain corresponding to the second setting value.

According to an embodiment of the invention, the at least one target value in step S510 may comprise a first target gain of the first frequency and a second target gain of the second frequency, or may be a ratio of the first target gain and the second target gain. The control unit 120 may select from the first setting value and the second setting value the one with the smallest error between the corresponding first gain and the first target gain and between the corresponding second gain and the second target gain as the setting value of the parameter corresponding to the electronic component being calibrated, or select from the first setting value and the second setting value the one with a ratio of the corresponding first gain and the corresponding second gain that is closest to the ratio of the first target gain and the second target gain as the setting value of the parameter corresponding to the electronic component being calibrated.

As described above, it is to noted that, in some embodiments of the invention, step S508 may also be repeatedly performed for multiple times according to different setting values of the parameters corresponding to the electronic components being calibrated. For example, a determination may be added in the calibration procedure after step S508 to determine whether all the setting values of the parameter have been tested. If not, step S508 is returned. If yes, step S510 is performed. After performing step S508 several times, the setting value in step S510 may be determined according to the target value and the first gains and the second gains corresponding to different setting values. For example, the control unit 120 may select the one having a ratio of the gains that is the closest to the ratio of the target gains from a plurality of setting values as the setting value of the parameter corresponding to the electronic component currently being calibrated.

In addition, it is to be noted that although the test signals having two different frequencies are utilized in the calibration procedure in the embodiments as described above, the invention is not limited thereto. The proposed parameter calibration method may also utilize more than two test signals having different frequencies to perform the calibration procedure. Those with ordinary skill in the art will derive how to implement the calibration procedure by using more than two test signals having different frequencies based on the embodiments as illustrated above, and details are omitted here for brevity.

Figure 6:
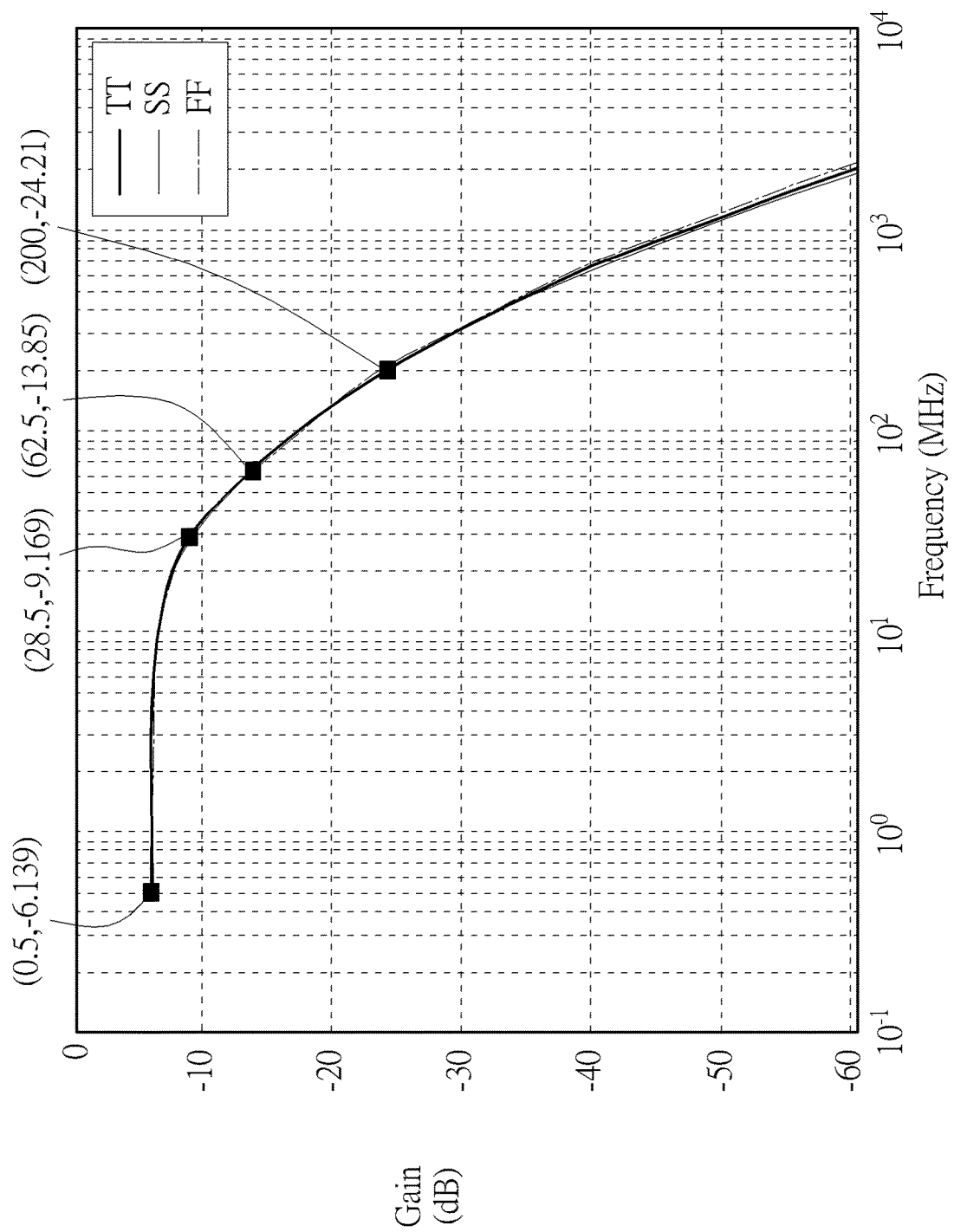
FIG. 6 shows exemplary frequency responses of a circuit after performing parameter calibration according to an embodiment of the invention.

FIG. 6 shows exemplary frequency responses of a circuit after performing parameter calibration according to an embodiment of the invention. In FIG. 6, the frequency responses of the same circuit that is comprised in the chips distributed in different process corners are shown, and the frequency responses are obtained after using the proposed parameter calibration method to determine the setting value of the parameters. In addition, the frequency responses shown in FIG. 6 are obtained when only one capacitor, such as the capacitor $C_B$ shown in FIG. 2, in the circuit is turned on. As shown in FIG. 6, after performing the proposed parameter calibration method on the same circuit in each chip, different setting values of the parameter are obtained. However, no matter which of the TT, FF or SS corner the chips are distributed, the curves of the frequency responses obtained after performing the proposed parameter calibration will be very similar.

Figure 7:
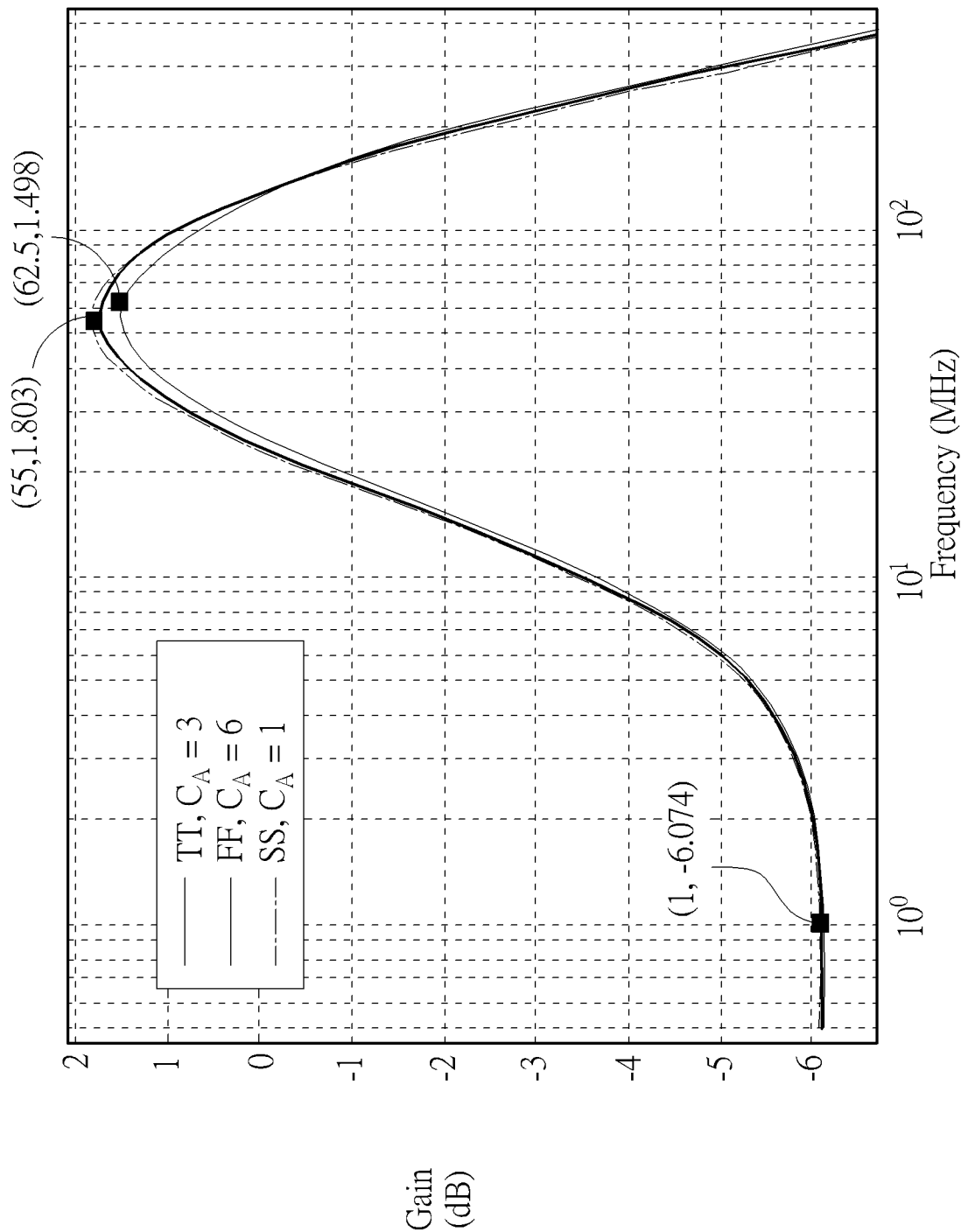
FIG. 7 shows exemplary frequency responses of a circuit after performing parameter calibration according to another embodiment of the invention.

FIG. 7 shows exemplary frequency responses of a circuit after performing parameter calibration according to another embodiment of the invention. In FIG. 7, the frequency responses of the same circuit that is comprised in the chips distributed in different process corners are shown, and the frequency responses are obtained after using the proposed parameter calibration method to determine the setting value of the parameters. In addition, the frequency responses shown in FIG. 7 are obtained when two capacitors, such as the capacitor $C_A$ and $C_B$ shown in FIG. 2, in the circuit are turned on. As shown in FIG. 7, after performing the proposed parameter calibration method on the same circuit in each chip, different setting values of the parameter are obtained. For example, for the chip distributed in the TT corner, the capacitance of the capacitor $C_A$ may be set to the third setting value (simply marked as $C_A$=3 in FIG. 7, and the same rule is applied in the following cases). For the chip distributed in the FF corner, the capacitance of the capacitor $C_A$ may be set to the sixth setting value ($C_A$=6). For the chip distributed in the SS corner, the capacitance of the capacitor $C_A$ may be set to the first setting value ($C_A$=1). However, no matter which of the TT, FF or SS corner the chips are distributed, the curves of the frequency responses obtained after performing the proposed parameter calibration will be very similar.

In summary, the proposed parameter calibration method is able to effectively compensate for the shift of circuit parameters caused by process variation. Through parameter calibration, the frequency response of the circuit can be corrected back to a predetermined shape or adjusted to have a specific shape. In this manner, even if the chip products are distributed in different process corners after leaving the factory, the frequency response of the circuits in each chip can be still calibrated to have the same or quite similar shape. In this way, the accuracy of subsequent estimation of transmission distance and parameter selection of the receiver circuit can be improved. In addition, in the conventional technology, the parameters of the equalizer circuit are adjusted according to the SNR of the received signal, but the adjustment of the parameters based on the SNR cannot ensure the accuracy of subsequent transmission distance estimation. Compared with the conventional technology, the proposed parameter calibration method can ensure the accuracy of the transmission distance estimation and thus the transmission performance can be effectively improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A parameter calibration method for calibrating a plurality of parameters corresponding to a plurality of electronic components to be calibrated in a circuit, comprising following steps:

(A) turning off all of the electronic components to be calibrated and selecting a first electronic component from the electronic components to be calibrated as an electronic component being calibrated;

(B) turning on the electronic component being calibrated and performing a calibration procedure on the electronic component being calibrated to determine a setting value of a parameter corresponding to the electronic component being calibrated, wherein after determining the setting value, the electronic component being calibrated becomes an electronic component that has been calibrated; and, (C) selecting a second electronic component from the electronic components to be calibrated as the electronic component being calibrated and performing step (B), wherein step (C) is repeatedly performed until all of the electronic components to be calibrated have become electronic components that have been calibrated, and when performing step (C), the electronic component(s) that have been calibrated are kept being turned on.

2. The parameter calibration method of claim 1, wherein the calibration procedure performed on the electronic component being calibrated comprises following steps:

(B11) setting the parameter corresponding to the electronic component being calibrated to a first setting value;

(B12) generating a first output signal according to a first test signal having a first frequency by the circuit;

(B13) calculating energy of a frequency component at the first frequency of the first output signal and calculating a first gain according to energy of the first test signal and the energy of the frequency component at the first frequency of the first output signal;

(B14) setting the parameter corresponding to the electronic component being calibrated to a second setting value different from the first setting value and performing step (B12) and step (B13) to obtain the first gain corresponding to the second setting value; and (B15) determining the setting value of the parameter corresponding to the electronic component being calibrated according to a target value, the first gain corresponding to the first setting value and the first gain corresponding to the second setting value.

3. The parameter calibration method of claim 1, wherein the calibration procedure performed on the electronic component being calibrated comprises following steps:

(B21) setting the parameter corresponding to the electronic component being calibrated to a first setting value;

(B22) sequentially generating a first output signal according to a first test signal having a first frequency and a second output signal according to a second test signal having a second frequency by the circuit;

(B23) calculating energy of a frequency component at the first frequency of the first output signal and calculating a first gain according to energy of the first test signal and the energy of the frequency component at the first frequency of the first output signal, and calculating energy of a frequency component at the second frequency of the second output signal and calculating a second gain according to energy of the second test signal and the energy of the frequency component at the second frequency of the second output signal;

(B24) setting the parameter corresponding to the electronic component being calibrated to a second setting value different from the first setting value and performing step (B22) and step (B23) to obtain the first gain and the second gain corresponding to the second setting value; and (B25) determining the setting value of the parameter corresponding to the electronic component being calibrated according to at least one target value, the first gain and the second gain corresponding to the first setting value and the first gain and the second gain corresponding to the second setting value.

4. The parameter calibration method of claim 3, wherein the at least one target value is a ratio of a first target gain of the first frequency and a second target gain of the second frequency.

5. The parameter calibration method of claim 3, wherein the at least one target value comprises a first target gain of the first frequency and a second target gain of the second frequency.

6. The parameter calibration method of claim 2, wherein step (B14) is repeatedly performed multiple times according to different setting values of the parameter corresponding to the electronic component being calibrated, and after step (B14) is repeatedly performed multiple times, the setting value of the parameter corresponding to the electronic component being calibrated is determined in step (B15) according to the target value and the first gain corresponding to said different setting values.

7. The parameter calibration method of claim 3, wherein step (B24) is repeatedly performed multiple times according to different setting values of the parameter corresponding to the electronic component being calibrated, and after step (B24) is repeatedly performed multiple times, the setting value of the parameter corresponding to the electronic component being calibrated is determined in step (B25) according to the at least one target value and the first gain and the second gain corresponding to said different setting values.

8. The parameter calibration method of claim 1, wherein the electronic components to be calibrated are a plurality of capacitors in the circuit, and wherein the parameters corresponding to the electronic components are capacitances of the capacitors.

9. A semiconductor device, comprising:

an equalizer circuit; and a control unit, coupled to the equalizer circuit and configured to calibrate a plurality of parameters corresponding to a plurality of electronic components to be calibrated in the equalizer circuit, wherein the control unit is configured to perform following operations:

(A) turning off all of the electronic components to be calibrated in the equalizer circuit and selecting a first electronic component from the electronic components to be calibrated as an electronic component being calibrated;

(B) turning on the electronic component being calibrated and performing a calibration procedure on the electronic component being calibrated to determine a setting value of a parameter corresponding to the electronic component being calibrated; and (C) selecting a second electronic component from the electronic components to be calibrated as the electronic component being calibrated and performing operation (B), wherein operation (C) is repeatedly performed until all of the electronic components to be calibrated have become electronic components that have been calibrated, and when performing operation (C), the electronic component(s) that have been calibrated are kept being turned on.

10. The semiconductor device of claim 9, wherein the calibration procedure performed on the electronic component being calibrated by the control unit comprises following operations:
(B11) setting the parameter corresponding to the electronic component being calibrated to a first setting value;
(B12) making the equalizer circuit to generate a first output signal according to a first test signal having a first frequency;
(B13) calculating energy of a frequency component at the first frequency of the first output signal and calculating a first gain according to energy of the first test signal and the energy of the frequency component at the first frequency of the first output signal;
(B14) setting the parameter corresponding to the electronic component being calibrated to a second setting value different from the first setting value and performing operation (B12) and operation (B13) to obtain the first gain corresponding to the second setting value; and
(B15) determining the setting value of the parameter corresponding to the electronic component being calibrated according to a target value, the first gain corresponding to the first setting value and the first gain corresponding to the second setting value.

11. The semiconductor device of claim 9, wherein the calibration procedure performed on the electronic component being calibrated by the control unit comprises following operations:
(B21) setting the parameter corresponding to the electronic component being calibrated to a first setting value;
(B22) making the equalizer circuit to sequentially generate a first output signal according to a first test signal having a first frequency and a second output signal according to a second test signal having a second frequency;
(B23) calculating energy of a frequency component at the first frequency of the first output signal and calculating a first gain according to energy of the first test signal and the energy of the frequency component at the first frequency of the first output signal, and calculating energy of a frequency component at the second frequency of the second output signal and calculating a second gain according to energy of the second test signal and the energy of the frequency component at the second frequency of the second output signal;
(B24) setting the parameter corresponding to the electronic component being calibrated to a second setting value different from the first setting value and performing operation (B22) and operation (B23) to obtain the first gain and the second gain corresponding to the second setting value; and
(B25) determining the setting value of the parameter corresponding to the electronic component being calibrated according to at least one target value, the first gain and the second gain corresponding to the first setting value and the first gain and the second gain corresponding to the second setting value.

12. The semiconductor device of claim 11, wherein the at least one target value is a ratio of a first target gain of the first frequency and a second target gain of the second frequency.

13. The semiconductor device of claim 11, wherein the at least one target value comprises a first target gain of the first frequency and a second target gain of the second frequency.

14. The semiconductor device of claim 10, wherein operation (B14) is repeatedly performed multiple times according to different setting values of the parameter corresponding to the electronic component being calibrated, and after operation (B14) is repeatedly performed multiple times, the setting value of the parameter corresponding to the electronic component being calibrated is determined in operation (B15) according to the target value and the first gain corresponding to said different setting values.

15. The semiconductor device of claim 11, wherein operation (B24) is repeatedly performed multiple times according to different setting values of the parameter corresponding to the electronic component being calibrated, and after operation (B24) is repeatedly performed multiple times, the setting value of the parameter corresponding to the electronic component being calibrated is determined in operation (B25) according to the at least one target value and the first gain and the second gain corresponding to said different setting values.

16. The semiconductor device of claim 9, wherein the electronic components to be calibrated are a plurality of capacitors comprised in the equalizer circuit, and wherein the parameters corresponding to the electronic components are capacitances of the capacitors.

* * * * *